Dec. 13, 1966 R. E. BERRYMAN 3,291,410

FLUID TAPE DRIVE SYSTEM

Filed April 30, 1965 2 Sheets-Sheet 1

INVENTOR.
RICHARD E. BERRYMAN
BY
AGENT

| | C10 | B14 | B16 | C12 |
|---|---|---|---|---|
| TAPE DRIVE TO LEFT | V | P | P | P |
| TAPE DRIVE STOP | P | P | V | P |
| TAPE DRIVE TO RIGHT | P | P | P | V |
| TAPE DRIVE STOP | P | V | P | P |

United States Patent Office 3,291,410
Patented Dec. 13, 1966

3,291,410

FLUID TAPE DRIVE SYSTEM

Richard E. Berryman, King of Prussia, Pa., assignor to Sperry Rand Corporation, New York, N.Y., a corporation of Delaware Filed Apr. 30, 1965, Ser. No. 452,188
7 Claims. (Cl. 242—55.12)

The invention hereinafter described and claimed has to do with improved means for driving strip or web material, such as magnetic tape. More particularly the invention relates to a fluid operated tape drive system including capstan and brake means providing for quick and smooth starting and stopping of the tape.

The primary object of the invention is to provide an improved tape drive system for moving tape in either of two opposite directions.

Another object of the invention is to provide such a system especially adapted to move magnetic tape smoothly and quickly from one high speed direction to another.

A further object is the provision of a pneumatically controlled tape drive system providing for rapid and smooth braking of the tape to a complete stop from high speed movement in one direction, and its rapid and smooth advancement in the opposite direction at an equally high speed.

In accordance with the above and first briefly described, the tape drive system of the instant invention comprises tape supply and take-up reels, and pneumatic means for moving the tape selectively in opposite directions from one to the other of the reels during which it may be moved past a magnetic transducer for the reading or writing of information on the tape, and wherein the moving means comprises a pair of pneumatically controlled oppositely rotating capstans, one on each side of the transducer, and pneumatically controlled brake means between each capstan and the transducer. Means is provided selectively to apply suction to only one of the pneumatically controlled capstan and brake elements and pressure to the others whereby either capstan may be utilized to drive the tape, and the brake on the opposite side of the transducer to the driving capstan is utilized to stop the tape smoothly and quickly while all other of the elements are pressurized so that the tape is riding over them on a cushion of air.

Figure 1:
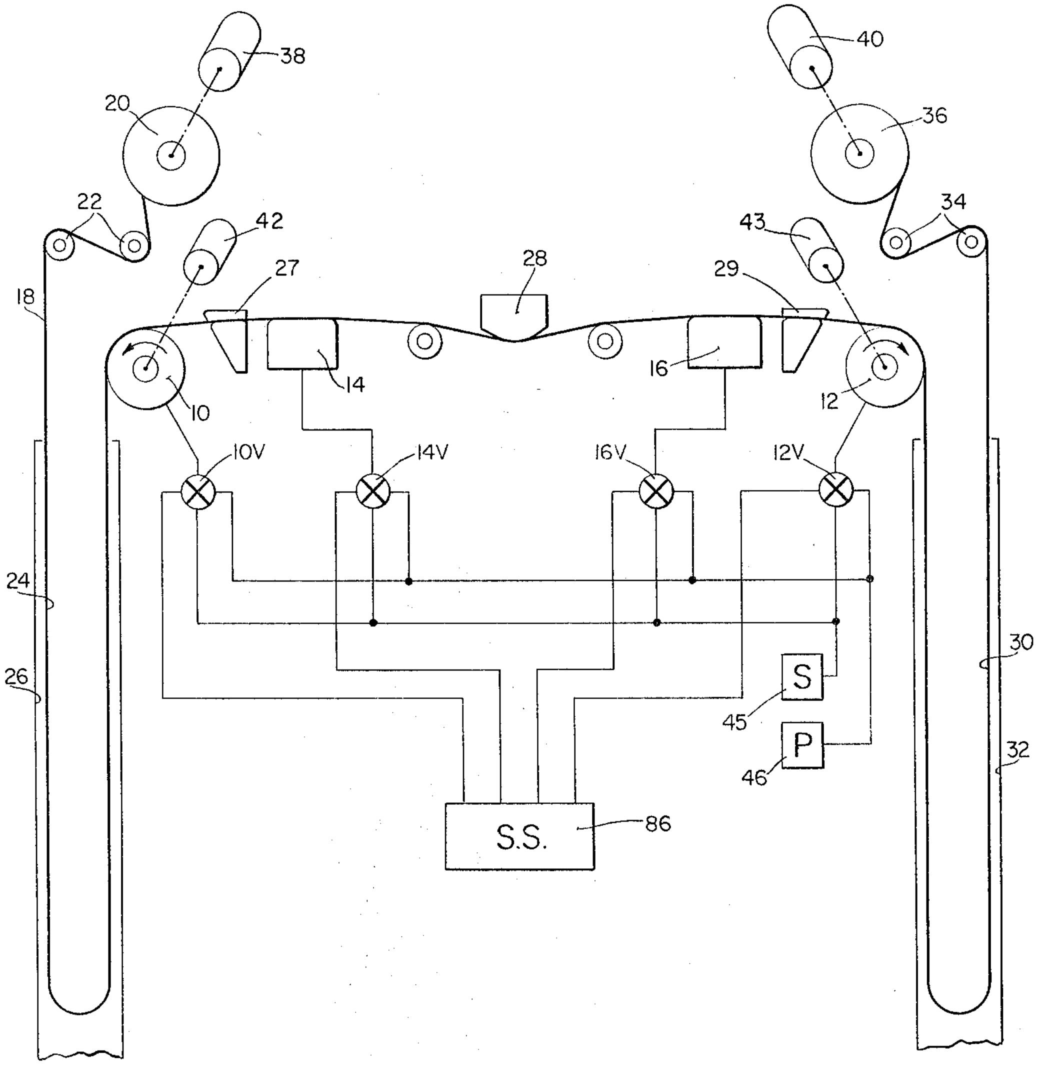
FIGURE 1 is a diagrammatic view of a magnetic tape drive system incorporating the invention.

With reference now to the details of the drawings, and first to FIGURE 1, it is seen that the tape drive system according to this preferred embodiment comprises the spaced pneumatic capstans 10 and 12 and the pneumatic brakes 14 and 16. Magnetic tape 18 from supply reel 20 is threaded over idler rollers 22 to form a loop 24 in vacuum column 26. The tape then flows over capstan 10, edge guide 27, brake 14, past magnetic transducer 28, over brake 16, edge guide 29 and capstan 12 into a loop 30 in vacuum column 32 from which it passes over idler rollers 34 to take-up reel 36.

Supply reel 20 is driven by a motor 38 actuated by conventional means, not forming a part of the present invention, either to pay out or take-up tape. The motor actuating means is responsive to the length of the loop 24 in vacuum column 26 to drive the motor in a direction to maintain the loop length substantially constant. Similarly the length cf the loop 30 in vacuum column 32 controls the drive motor 40 of take-up reel 36 to maintain this loop at a substantially constant length.

When in operation capstans 10 and 12 are continuously driven in counter rotating directions, counter-clockwise and clockwise, by motors 42 and 43, respectively. Both capstans are of the pneumatic type such as shown, by way of example, in applicants copending application entitled "Fluid Capstans," Serial No. 440,823, filed March 1965 and assigned to the same assignee. Each includes a valve identified 10V and 12V respectively, for selectively connecting it either to a source of suction 45 or pressure 46. Suction is applied to a selected capstan to draw the tape 18 into engagement with its surface and drive the tape in the direction of capstan rotation. Simultaneously, pressure is applied to the other capstan to blow or press it away from contact therewith and support the tape upon a cushion of air forming a fluid bearing.

Pneumatic brakes 14 and 16 may be formed in any suitable manner whereby either suction or pressure can be applied to the tape passing over their upper surfaces, either to draw the tape against the surface for braking or to support it upon a fluid bearing.

Figures 2, 3:
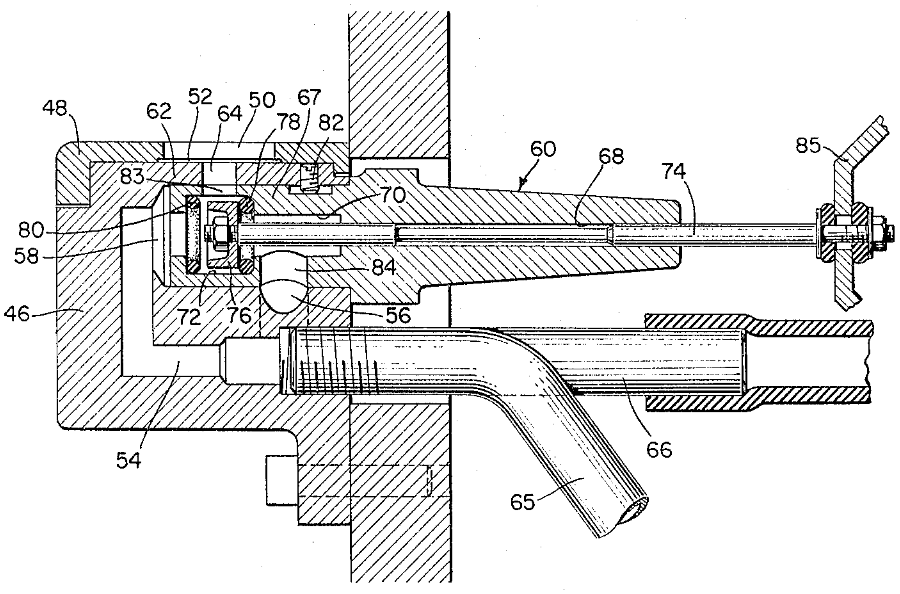
FIGURE 2 is a chart of the pneumatic cycling of the capstans and brakes.
FIGURE 3 is a sectional view taken along the line 3—3 of FIGURE 1.

With reference now to FIGURE 3, it is seen that each brake comprises a fixed body member 46 having a member 48 forming a smooth top surface. The member 48 is provided with a fluid porous surface consisting, in this preferred embodiment, of apertures 50 arranged across its surface to override a cavity 52 formed in and extending across its under-surface a distance less than the contact of the tape therewith. Cavity 52 cooperates with the body member 46 to form a plenum chamber for distributing the fluid pressure in the area of tape contact with the brake.

A series of galleries or air passageways 54 and 56 formed in body 46 extend from its back surface to an axially extending bore 58 in which a poppet valve 60 is positioned. It will be noted that the bore 58 is separated from the plenum chamber 52 only by a thin wall 62 and in open communication therewith through a small aperture 64.

As in the case of the capstans, the poppet valve 60 provides the means for quickly connecting the aperture 64—and thus the plenum chamber 52—selectively with the source of vacuum 45 or pressure 46 by way of passageways 54 or 56, and tubes or conduits 65 or 66. The valve comprises a cylinder 67 closely fitted into bore 58. The cylinder is provided with axially aligned bores 68, 70 and 72 of increasingly larger diameter. Bore 68 provides a sliding bearing surface for supporting the inner end of the slender valve stem 74 having attached to its inner end a valve head 76 which is positioned in chamber 72, selectively to seat against resilient O-rings 78 or 80 at opposite ends of the chamber. The sleeve is secured in bore 58 as by the set screw 82.

It will be seen that when valve head 76 is against O-ring 78, as shown, suction passageway 54 is in open communication with the plenum chamber 52 by way of the open inner end of cylinder 67 and an aperture 83 extending through the cylinder intermediate the O-rings 78 and 80, and in registry with the aperture 64 communicating with the plenum chamber 52. When the valve head 76 is moved to the left against O-ring 80, pressure passageway 56 is in communication with the plenum chamber through the aperture 84 in the lower part of the cylinder, the bore 70, through O-ring 78, chamber 72, and apertures 82 and 64.

By reason of the close proximity of valve chamber 72 with plenum chamber 52—through the thin wall 62—response of the tape passing over the brake will be almost simultaneous with the operation of the valve to either of its positions against O-ring 78 or 80. Actuation of the valve may be by any suitable means, but preferably comprises a permanent magnet and voice-coil assembly 85 such as shown and described in applicants above-identified co-pending application. In that application, the valve is actuated by the interaction of a permanent magnet field and the flow of direct current through a voice-coil. The direction of current through the coil determines the direction of movement of the valve head 76.

Thus it will be understood that suction or pressure can be applied selectively to the capstans and brakes either to draw the tape into contact therewith or to blow it away to ride upon a fluid bearing.

In particular accordance with the present invention, suction or pressure is selected by the signal source 86 (FIGURE 1), and in accordance with the chart of FIGURE 2. If it is desired to drive the tape to the left, signals from source 86 actuate the appropriate valves whereby suction or vacuum is applied to capstan 10 and pressure to both brakes and the other capstan. To reverse the tape direction, it is first brought to a quick smooth stop by applying vacuum through valve 16V to brake 16 and pressure to the other brake and two capstans by way of their valves 14V, 10V and 12V. By using the brake farthest from the driving capstan to stop the tape, it is quickly and smoothly brought to a halt without kinks or loops being formed in the area between the brakes. Thus when the tape flow is reversed by applying suction to capstan 12 and pressure to the other elements there is no danger of losing signals by reason of loose tape jumping past the transducer 28, or of breaking the tape by a sudden snap.

Control means 86 for the valves may be of any suitable type, but it is preferred to use the circuit shown and described in the copending application entitled Tape Transport System, filed concurrently herewith in thhe name of R. S. Woolridge, Serial No. 452,252, and assigned to the same assignee as the instant invention.

The embodiments of the invention in which an exclusive property or privilege is claimed are defined as follows:

1. A magnetic tape system for moving tape in either of two opposite directions past a magnetic transducer for reading or writing of information on the tape, comprising:
- (A) a supply of tape;
- (B) tape take-up means to which tape is fed from said tape supply and vice versa; and
- (C) means for moving said tape from one to the other of A and B selectively during which movement it passes in operative relation with said transducer which is positioned in the path of movement of said tape; said tape moving means comprising:
  - (a) a first pneumatic capstan means positioned on one side of said transducer and over which said tape is fed to and from said supply;
  - (b) a second pneumatic capstan means positioned on the opposite side of said transducer and over which said tape is fed to and from said take-up means;
  - (c) means for rotating said first and second capstan means continuously in opposite directions, counterclockwise and clockwise respectively;
  - (d) a first pneumatic brake means positioned in the path of tape movement between said transducer and said first capstan means and over which said tape is fed;
  - (e) a second pneumatic brake means positioned in the path of tape movement between said transducer and said second capstan means and over which said tape is fed; and
  - (f) means for selectively applying vacuum to one only of said pneumatic means and pressure to all the others simultaneously therewith whereby said tape may be moved at high speed in one direction, quickly and smoothly stopped and then moved at high speed in the opposite direction.

2. A tape drive system according to claim 1 wherein the means for applying vacuum and pressure comprises:
- (A) means to apply vacuum to said second capstan means only, for moving said tape from said supply to said take-up means;
- (B) means to apply pressure to said first capstan means and said first and second brake means whereby said tape passes over these means on a fluid cushion; and
- (C) means to reverse the pneumatic condition of said second capstan from vacuum to pressure and simultaneously therewith reverse the pneumatic condition of said first brake means from pressure to suction thereby to stop the movement of tape from said supply to said take-up means.

3. A system according to claim 1 wherein the means of clause (f) comprises:
- (A) means to apply vacuum to said first capstan means only thereby to move said tape from said take-up to said supply means;
- (B) means to apply pressure to said second capstan means and both of said brake means whereby said tape passes over these means on a fluid cushion; and
- (C) means to reverse the pneumatic condition of said first capstan means from vacuum to pressure and simultaneously therewith reverse the pneumatic condition of said second brake means from pressure to vacuum thereby to stop the movement of tape from said take-up to said supply means.

4. A magnetic tape system for moving tape in either of two opposite directions past a magnetic transducer for reading or writing of information on the tape, comprising:
- (A) a supply of tape;
- (B) tape take-up means to which tape is fed from said tape supply and vice versa; and
- (C) means for moving said tape from one to the other of A and B selectively during which movement it passes in operative relation with said transducer which is positioned in the path of movement of said tape; said tape moving means comprising:
  - (a) a first pneumatic capstan means positioned on one side of said transducer and over which said tape is fed to and from said supply;
  - (b) a second pneumatic capstan means positioned on the opposite side of said transducer and over which said tape is fed to and from said take-up means;
  - (c) means for rotating said first and second capstan means continuously in opposite directions, counter-clockwise and clockwise respectively;
  - (d) a first pneumatic brake means positioned in the path of tape movement between said transducer and said first capstan means and over which said tape is fed;
  - (e) a second pneumatic brake means positioned in the path of tape movement between said transducer and said second capstan means and over which said tape is fed;
  - (f) means to apply vacuum to said second capstan means only, for moving said tape from said supply to said take-up means;
  - (g) means to apply pressure to said first capstan means and said first and second brake means whereby said tape passes over these means on a fluid cushion;
  - (h) means to reverse the pneumatic condition of said second capstan from vacuum to pressure and simultaneously therewith reverse the pneumatic condition of said first brake means from pressure to suction thereby to stop the movement of tape from said supply to said take-up means;
  - (i) means to apply vacuum to said first capstan means only thereby to move said tape from said take-up to said supply means;

(j) means to apply pressure to said second capstan means and both of said brake means whereby said tape passes over these means on a fluid cushion; and (k) means to reverse the pneumatic condition of said first capstan means from vacuum to pressure and simultaneously therewith reverse the pneumatic condition of said second brake means from pressure to vacuum thereby to stop the movement of tape from said take-up to said supply means.

5. A magnetic tape moving system according to claim 1 wherein said supply of tape comprises:

(A) a reel of tape;

(B) means for rotating said reel in either a clockwise or a counter-clockwise direction;

(C) means for forming said tape into a loop between said reel and said first capstan whereby as the tape approaches the first capstan it is wrapped in substantial contact with the capstan for driving engagement therewith while vacuum is being applied to the capstan for moving the tape; and (D) means responsive to the length of said tape loop for rotating said reel to maintain said loop at a substantially constant length.

6. A magnetic tape moving system according to claim 1 wherein said tape take-up means comprises:

(A) a reel of tape;

(B) means for rotating said reel in either a clockwise or a counter-clockwise direction;

(C) means for forming said tape into a loop between said reel and said second capstan whereby as the tape approaches the second capstan it is wrapped in substantial contact with the capstan for driving engagement therewith while vacuum is being applied to the capstan for moving the tape; and (D) means responsive to the length of said tape loop for rotating said reel to maintain said loop at a substantially constant length.

7. A magnetic tape moving system according to claim 1 wherein said supply of tape comprises:

(A) a reel of tape;

(B) means for rotating said reel in either a clockwise or a counter-clockwise direction;

(C) means for forming said tape into a loop between said reel and said first capstan whereby as the tape approaches the first capstan it is wrapped in substantial contact with the capstan for driving engagement therewith while vacuum is being applied to the capstan for moving the tape;

(D) means responsive to the length of said tape loop for rotating said reel to maintain said loop at a substantially constant length; and wherein said take-up means comprises (E) a reel of tape;

(F) means for rotating said reel in either a clockwise or a counter-clockwise direction;

(G) means for forming said tape into a loop between said reel and said second capstan whereby as the tape approaches the second capstan it is wrapped in substantial contact with the capstan for driving engagement therewith while vacuum is being applied to the capstan for moving the tape; and (H) means responsive to the length of said tape loop for rotating said reel to maintain said loop at a substantially constant length.

References Cited by the Examiner

UNITED STATES PATENTS 3,093,283 6/1963 Hodges ---------------- 226—97
3,097,778 7/1963 Pendleton -------------- 226—95

FRANK J. COHEN, *Primary Examiner.*

LEONARD D. CHRISTIAN, *Examiner.*